(12) United States Patent
Slater et al.

(10) Patent No.: US 8,488,933 B2
(45) Date of Patent: Jul. 16, 2013

(54) METHOD AND APPARATUS FOR MECHANICALLY CLEAVING A STRIPPED END SECTION OF AN OPTIC FIBER CORE

(75) Inventors: Brett Hoe Slater, Mount Colah (AU); Brent David Allwood, Buttaba (AU); Bryce Nicholls, Green Point (AU)

(73) Assignee: ADC GmbH, Berlin (DE)

( * ) Notice: Subject to any disclaimer, the term of this patent is extended or adjusted under 35 U.S.C. 154(b) by 236 days.

(21) Appl. No.: 13/037,035

(22) Filed: Feb. 28, 2011

(65) Prior Publication Data

US 2011/0262101 A1    Oct. 27, 2011

(30) Foreign Application Priority Data

Mar. 2, 2010   (AU) ................................ 2010200788

(51) Int. Cl.
*G02B 6/00*    (2006.01)
(52) U.S. Cl.
USPC ......................................................... 385/134
(58) Field of Classification Search
None
See application file for complete search history.

(56) References Cited

U.S. PATENT DOCUMENTS

| | | | |
|---|---|---|---|
| 5,024,363 A | 6/1991 | Suda et al. | |
| 6,634,079 B1 | 10/2003 | Kazama | |
| 6,801,705 B2 | 10/2004 | Sasaki et al. | |
| 2002/0031323 A1* | 3/2002 | Hattori et al. | 385/137 |
| 2002/0181919 A1* | 12/2002 | Yasuda | 385/134 |
| 2004/0228596 A1* | 11/2004 | Tabeling | 385/134 |
| 2006/0201986 A1 | 9/2006 | Sasaki et al. | |
| 2007/0292092 A1* | 12/2007 | Hayashi et al. | 385/134 |
| 2009/0224019 A1* | 9/2009 | Ohtsuka et al. | 225/2 |
| 2012/0057837 A1* | 3/2012 | Heidler et al. | 385/135 |
| 2012/0125166 A1* | 5/2012 | Hallett et al. | 83/13 |

* cited by examiner

*Primary Examiner* — Sung Pak
(74) *Attorney, Agent, or Firm* — Merchant & Gould P.C.

(57) ABSTRACT

Apparatus for mechanically cleaving a stripped end section of an optic fiber core, including a receiving section including an optic fiber guide for receiving the stripped end section of the optic fiber core; a clamping section for receiving a terminal end section of the optic fiber core from the receiving section and securing said terminal end section in a fixed position; and a cleaving section including a cleaving member and cleaving blade, said member being operable to move between an optic fiber receiving position and an optic fiber cleaving position where the blade is positioned to at least partially fracture the optic fiber core extending between the receiving section and the clamping section, wherein movement of the cleaving member towards the cleaving position effects at least partial separation movement between the guide and the clamping section so as to tension and thereby cleave the optic fiber core extending therebetween.

16 Claims, 8 Drawing Sheets

Figure 17

METHOD AND APPARATUS FOR MECHANICALLY CLEAVING A STRIPPED END SECTION OF AN OPTIC FIBER CORE

This application claims benefit of Ser. No. 2010200788, filed 2 Mar. 2010 in Australia and which application is incorporated herein by reference. To the extent appropriate, a claim of priority is made to the above disclosed application.

TECHNICAL FIELD OF THE INVENTION

The present invention relates to a method and apparatus for mechanically cleaving a stripped end section of an optic fiber core.

BACKGROUND OF THE INVENTION

An optical connection between optic fibers can be effected by fusion or mechanical splicing. In general, fusion splicing involves joining two optic fibers end-to-end and effecting optical connection using heat and mechanical splicing involves holding two optic fibers in alignment so that light can pass from one to the other.

Previously, the equipment used to effect fusion splicing has been cumbersome and relatively expensive. Further the equipment may not be readily portable so as to effect splicing on location.

Mechanical splicing typically involves either passive or active alignment of optic fiber cores. Passive alignment relies on precision reference surfaces, generally grooves or cylindrical holes, to align fiber cores during splicing. Active alignment involves the use of light for accurate fiber alignment, and may consist of either monitoring the loss through the splice during splice alignment or by using a microscope to accurately align the fiber cores for splicing. To monitor loss, either an optical source and optical power meter; or an optical time domain reflectometer (OTDR) is used.

In either case, before splicing can be effected, the ends of the optic fibers typically need to be cleaved. A cleave is a deliberate, controlled break, intended to create a perfectly flat end face, perpendicular to the longitudinal axis of the fiber. A cleave is typically made by first introducing a microscopic fracture ("nick") into the fiber with a special tool which has a sharp blade of some hard material, such as diamond, sapphire, or tungsten carbide. If proper tension is applied to the fiber as the nick is made, or immediately afterward, then the fracture will propagate in a controlled fashion, creating the desired end face.

Good cleaves are required for successfully splicing optical fibers, whether by fusion or mechanical process. Previously, the cleaving process typically involves the use of specialised equipment that is relatively expensive and may not be readily portable. As such, a technician may not have been able to easily take the cleaving apparatus to the location where splicing is to be effected.

It is generally desirable to overcome or ameliorate one or more of the above mentioned difficulties, or at least provide a useful alternative.

SUMMARY OF THE INVENTION

In accordance with one aspect of the invention, there is provided an apparatus for mechanically cleaving a stripped end section of an optic fiber core, including:
(a) a receiving section including an optic fiber guide for receiving the stripped end section of the optic fiber core;
(b) a clamping section for receiving a terminal end section of the optic fiber core from the receiving section and securing said terminal end section in a fixed position; and
(c) a cleaving section including a cleaving member and cleaving blade, said member being operable to move between an optic fiber receiving position and an optic fiber cleaving position where the blade is positioned to at least partially fracture the optic fiber core extending between the receiving section and the clamping section,
wherein movement of the cleaving member towards the cleaving position effects at least partial separation movement between the guide and the clamping section so as to tension and thereby cleave the optic fiber core extending therebetween.

Preferably, the cleaving member includes a cleave button and a reset button separated by one or more one elongate members which are shaped to translate through corresponding pairs of translation slots of the cleaving section as the cleaving member moves between the receiving position and the cleaving position.

Preferably, the cleaving section includes a sliding member through which the cleaving member translates between the optic fiber receiving position and the optic fiber cleaving position.

Preferably, the sliding member is adapted to move transversely to a direction of movement of the cleaving member as the cleaving member translates through the sliding member towards the cleaving position, the transverse movement effecting said at least partial separation movement between the guide and the clamping section so as to tension and thereby cleave the optic fiber core extending therebetween.

Preferably, the sliding member engages the guide of the receiving section during said transverse movement and forces the guide away from the clamping section thereby effecting said at least partial separation movement between the guide and the clamping section.

Preferably, the cleaving member includes or more one or more tapered flanges arranged to engage and translate along corresponding tapered sections of the sliding member as the cleaving member moves towards the optic fiber cleaving position to effect the transverse movement.

In accordance with another aspect of the invention, there is provided a method for mechanically cleaving an optic fiber core using the above-described apparatus, including the steps of:
(a) inserting the optic fiber core into the guide of the receiving section of the apparatus until a terminal end section of the optic fiber core is arranged in the clamping section of the apparatus;
(b) securing the terminal end section of the optic fiber core in a fixed position the clamping section; and
(c) moving the cleaving member of the apparatus from a receiving position towards a cleaving position so that a cleaving blade at least partially fractures the optic fiber core,
wherein movement of the cleaving member towards the cleaving position effects at least partial separation movement between the guide and the clamping section so as to tension and thereby cleave the optic fiber core extending therebetween.

Preferably, the method further includes the step of further moving the cleaving member from the cleaving position towards a further tensioning position to effect further separation movement between the guide and the clamping section so as to further tension and thereby cleave the optic fiber core extending therebetween.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

The apparatus 10 shown in FIGS. 1 to 5 and 8 to 15 is a hand operated tool for mechanically cleaving a stripped end section 12 of an optic fiber 14 in preparation for fusion or mechanical splicing. The apparatus 10 is preferably relatively inexpensive and is readily portable so that a technician can perform cleaving at a location where splicing is to be effected.

The apparatus 10 includes generally rectangular housing 16 that is of suitable size and shape to fit in the hand of a person. The apparatus 10 includes a receiving section 18 coupled to the housing 16 which includes an optic fiber guide 20 for receiving the stripped end section 12 of the optic fiber core 14 and directing it into the housing 16. The stripped end section is approximately 30 mm long and is preferably prepared by stripping off the primary buffer using standard industry hand tools. Otherwise, any suitable tools can be used to strip the end section of the optic fiber core 12.

The apparatus also includes a clamping section 22 for receiving a terminal end section 24 of the optic fiber core 12 from the receiving section 18 and securing the terminal end section 24 in a fixed position. The apparatus 10 further includes a cleaving section 26 including a cleaving member 28 and cleaving blade 30. The cleaving member 28 is operable to move between the optic fiber receiving position shown in FIG. 1 and the optic fiber cleaving position shown in FIG. 11 where the blade 30 is positioned to at least partially fracture the optic fiber core extending between the receiving section 18 and the clamping section 22. Movement of the cleaving member 28 towards the cleaving position effects at least partial separation movement between the guide 20 and the clamping section 22 so as to increase distance "U" and thereby tension the optic fiber core 12 extending therebetween. Tensioning the end section 24 of optic fiber core 12 as the fracture is made, or immediately thereafter, propagates the fracture in a controlled manner creating the desired cleaved end face of the optic fiber core 12. Operation of the components of the apparatus 10 to effect cleaving is described in further detail below.

Figure 1:
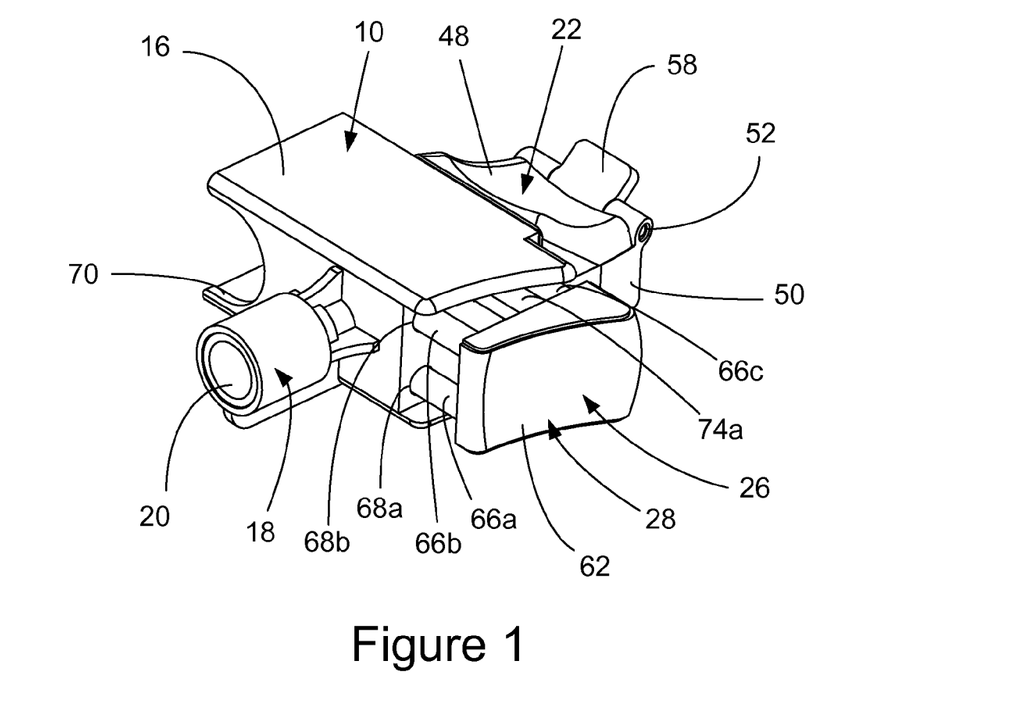
FIG. 1 is a front perspective view of an apparatus for mechanically cleaving a stripped end section of an optic fiber core.
Figure 2:
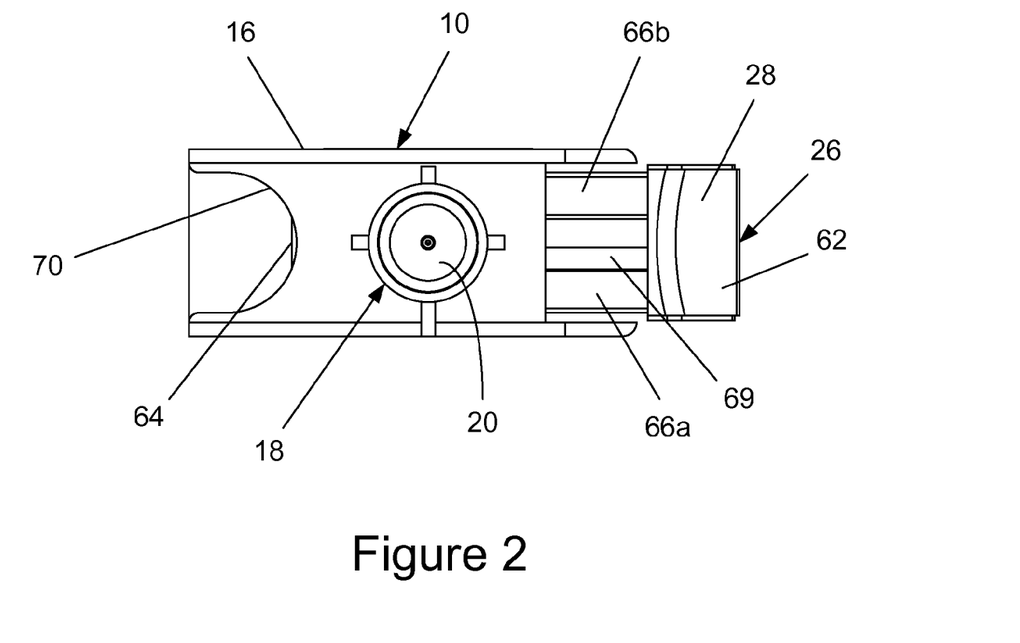
FIG. 2 is a front view of the apparatus shown in FIG. 1.
Figure 3:
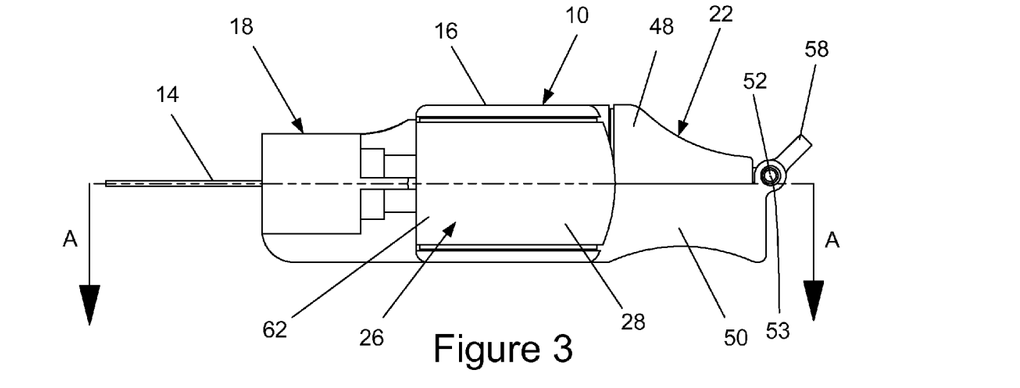
FIG. 3 is an end view of the apparatus shown in FIG. 1 coupled to an optic fiber.
Figure 4:
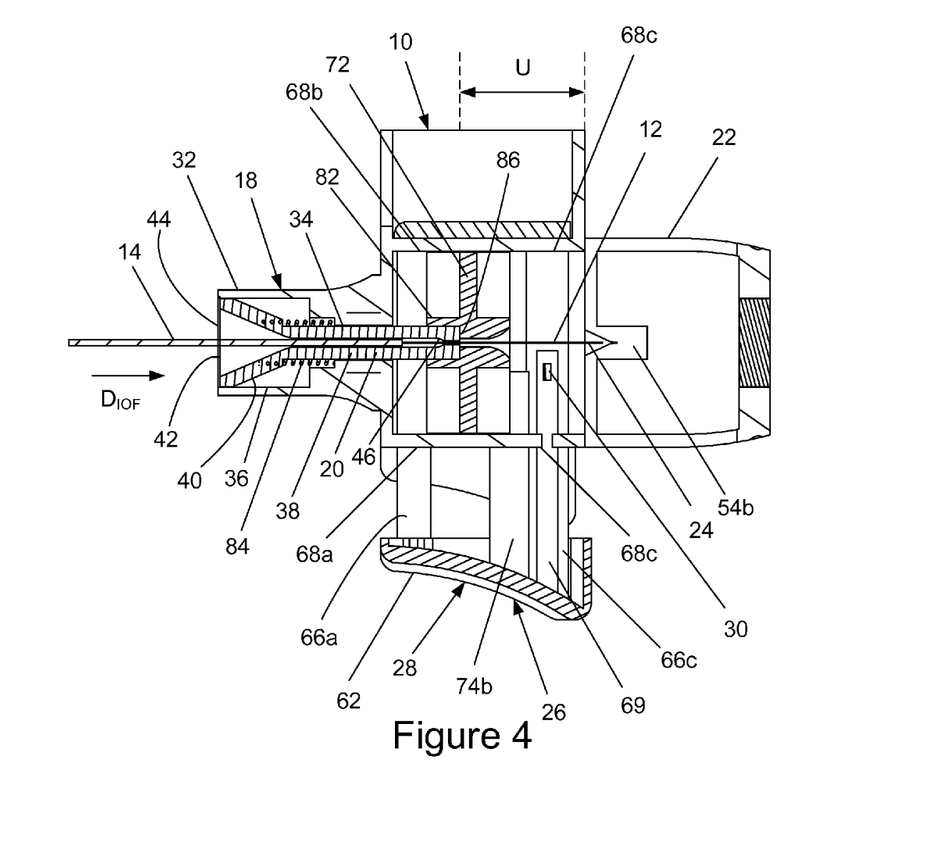
FIG. 4 is a section view of the apparatus shown in FIG. 3 through the line A-A.
Figure 5:
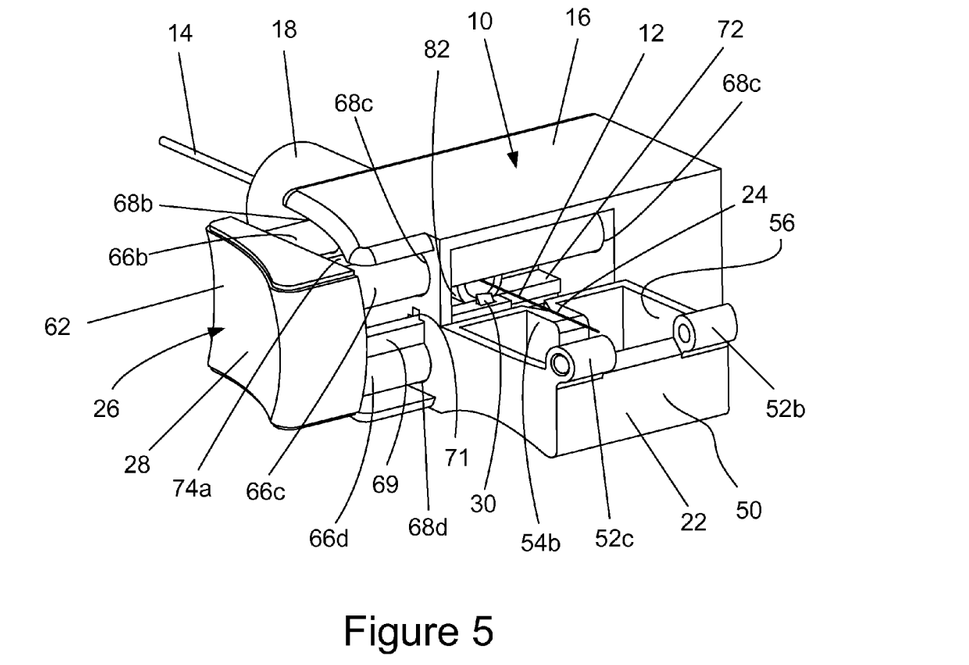
FIG. 5 is a rear perspective view of the apparatus shown in FIG. 1 with a part of the clamping section removed.

As particularly shown in FIG. 4, the receiving section 18 includes a guide support 32 that extends outwardly from a front side of the housing 16. The guide support 32 includes an inner cylindrical section 34 and an outer cylindrical section 36 which are respectively shaped to receive inner 38 and outer 40 sections of the optic fiber guide 20. The inner cylindrical section 34 of the guide support 32 is of slightly larger diameter than the cylindrical inner section 38 of the guide 20 so that the guide 20 can translate back and forth along the guide support 32. The diameter of the inner section 38 of the guide 20 is preferably 1.15 mm.

The outer cylindrical section 36 of the guide support 32 is of greater diameter than the inner cylindrical section 34 of the guide support 32 and is of suitable size to receive and support therein the conical outer section 40 of the guide 20. The outer peripheral edge 42 of the conical outer section 40 of the guide 20 preferably sits just inside the outer peripheral edge 44 of the outer cylindrical section 34 of the guide support 32. The conical outer section 40 of the guide 20 is shaped to receive the terminal end section 24 of the optic fiber core 12 and channel it into the inner section 38 of the guide 20.

The inner section 38 of the guide 20 includes a necked barrier 46 for limiting movement of the optic fiber 14 through the guide 20 in direction $D_{IOF}$. The diameter of the opening of the necked barrier 46 is preferably 0.5 mm which allows the optic fiber core 12 having a diameter of 0.125 mm, for example, to pass there through and blocks passage of the casing of the optic fiber 14 which has a diameter of 0.9 mm, for example. The casing preferably includes cladding, buffer and/or jacket of the optic fiber 14. Alternative dimensions for the inner section 38 of the guide 20 and the necked barrier 46 can be used to suit the optic fiber 14 being used.

As above-mentioned, the clamping section 22 mechanically clamps the terminal end section 24 of the optic fiber core 12. As particularly shown in FIG. 10, the clamping section 22 includes a lid 48 and a base 50 coupled together by a hinge 52. The hinge is preferably formed in three parts 52a, 52b, 52c, one part 52a being coupled to the lid 48 which is arranged for location between the two parts 52b, 52c coupled to the base 50. The parts are coupled together by an axle 53 extending through the parts 52a, 52b, 52c when so arranged. Alternatively, the parts 52a, 52b, 52c can be hinged together using any other suitable means.

Figure 10:
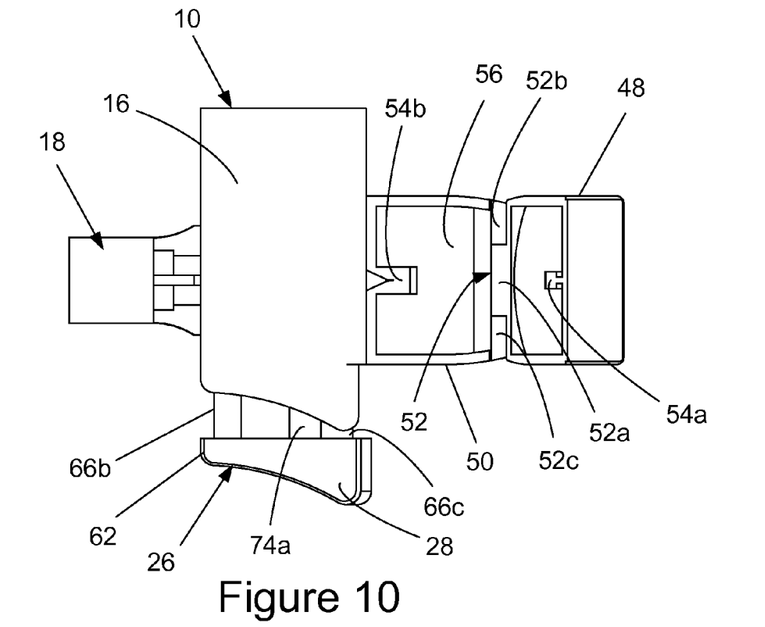
FIG. 10 is a plan view of the apparatus shown in FIG. 1 with the clamping member laid open.
Figure 11:
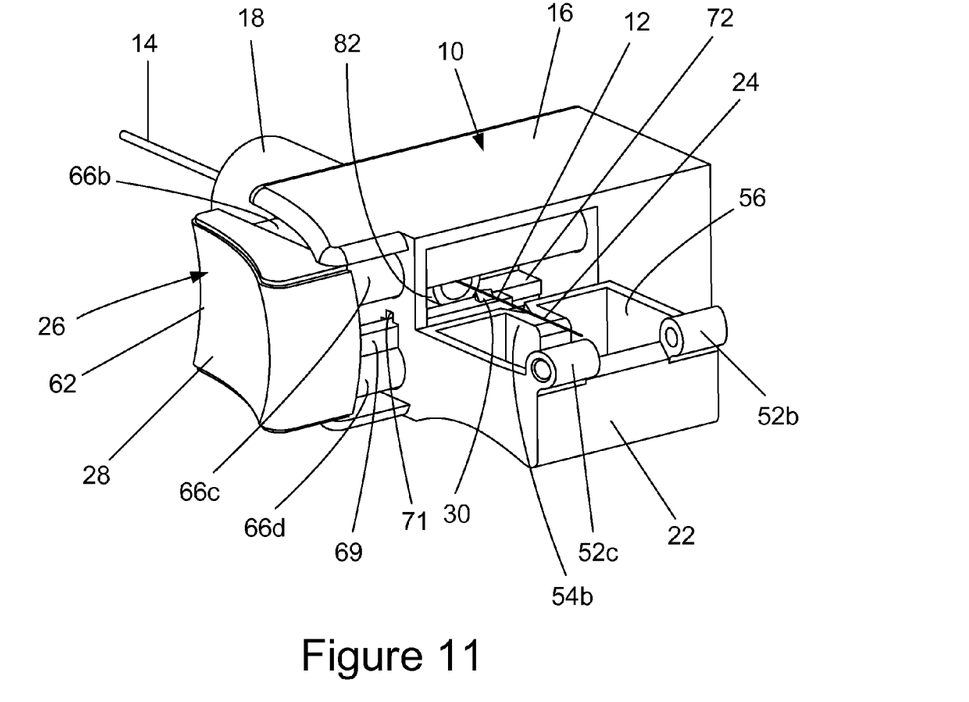
FIG. 11 is a rear perspective view of the apparatus shown in FIG. 1 arranged in a cleaving position with a part of the clamping section removed.
Figure 12:
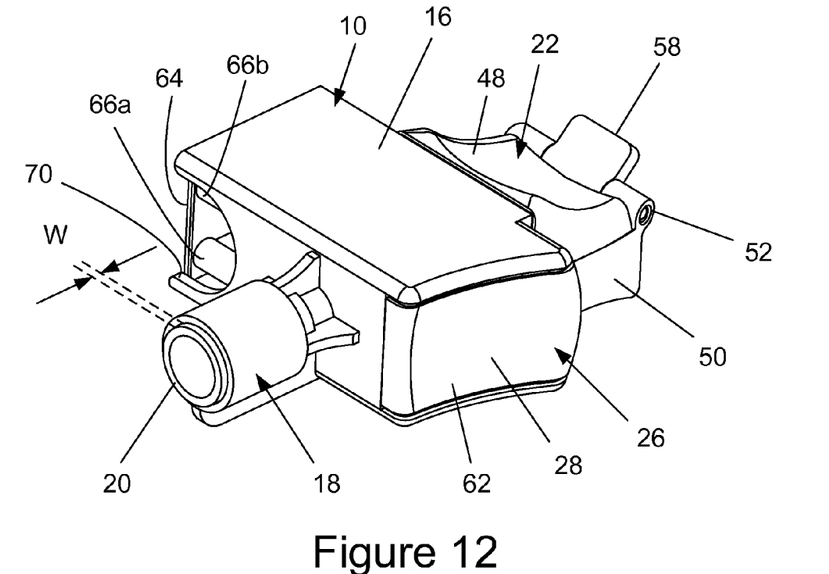
FIG. 12 is a front perspective view of the apparatus shown in FIG. 1 arranged in the further tensioning position.
Figure 13:
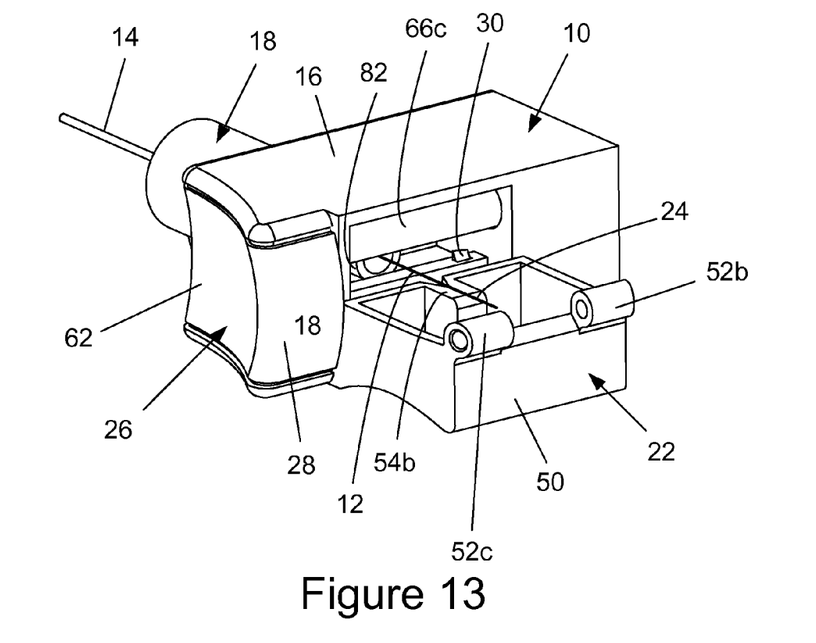
FIG. 13 is a rear perspective view of the apparatus shown in FIG. 12 arranged in the cleaving position with a part of the clamping section removed.
Figure 14:
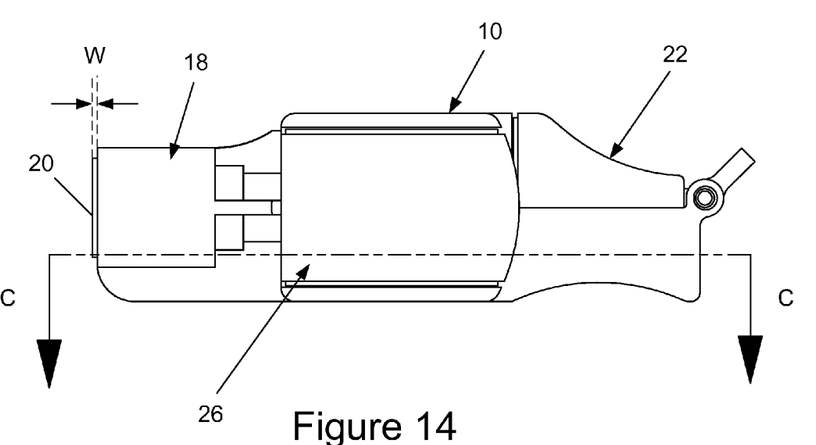
FIG. 14 is a side view of the apparatus shown in FIG. 12.

The terminal end section 24 of the optic fiber core 12 is clamped between clamping platforms 54a, 54b of the lid 48 and base 50 respectfully which overlie and engage each other when the clamping section 22 is hinged closed. The terminal end section 24 of the optic fiber core 12 is thereby held in a fixed position under pressure applied to the clamping section 22 by the technician to close the lid 48 against the base 50.

The base 50 of the clamping section 22 includes a storage compartment 56 for temporarily storing cleaved end sections 24 of optic fiber cores 12. Once cleaving has been effected, the cleaved fiber core is removed from the housing 16 for use in a mechanical splice connection, for example. The technician can then open the clamping lid 48 to reveal the unwanted fiber stub. The unwanted stub can either be temporarily brushed aside into the fiber storage compartment 56 of the apparatus 10 or removed permanently and disposed in a sharps bin. The lid 48 of the clamping section 22 also includes a lever 58 to assist in opening and closing the lid 48.

Figure 7:
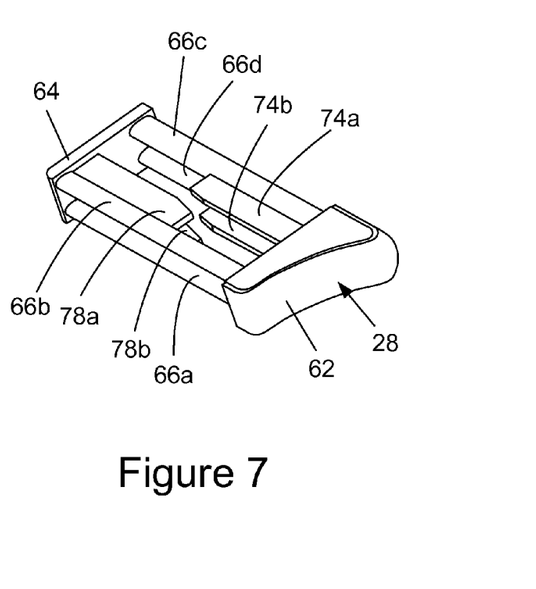
FIG. 7 is a front perspective view of a cleaving member of the apparatus shown in FIG. 1.
Figure 8:
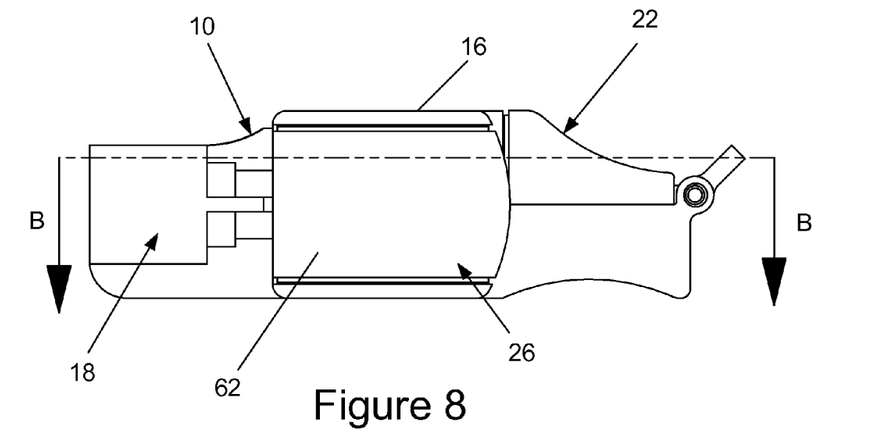
FIG. 8 is another end view of the apparatus shown in FIG. 1.

As particularly shown in FIG. 7, the cleaving member 28 includes cleaving button 62 and a reset button 64 separated by four elongate members 66a, 66b, 66c, 66d which are shaped to translate through corresponding pairs of translation slots 68a, 68b, 68c, 68d of the cleaving section 26 as the cleaving member moves from the receiving position towards the cleaving position in direction $D_{CMC}$. The cleaving section 28 also includes a recess button access point 70 through which the reset button 64 can be accessed by a technician to force the reset button 64 to move, in the opposite direction to $D_{CMC}$, back into the housing 16 and drive the cleaving member 28 back through the slots 68a, 68b, 68c, 68d towards the receiving position. As particularly shown in FIG. 5, the blade 30 of the cleaving is seated in cleaving arm 69 mounted on elongate member 66d. The cleaving are 69 is adapted to translate through cleaving arm slot 71 as the cleaving member moves between the receiving position and the cleaving position.

The cleaving section 26 also includes a sliding member 72 through which the cleaving member 28 translates between the optic fiber receiving position and the optic fiber cleaving position. The sliding member 72 is adapted to move transversely in direction $D_{SLC}$ to a direction of movement $D_{CMC}$ of the cleaving member 28 as the cleaving member 28 translates through the translation slots 68a, 68b, 68c, 68d towards the cleaving position. The transverse movement of the sliding member 72 effects the aforementioned at least partial separation movement between the guide 20 and the clamping section 22 so as to tension and thereby cleave the optic fiber core 12 extending therebetween.

The cleaving member 28 is adapted to travel beyond the cleaving position in direction $D_{CMC}$ to the further tensioning position shown in FIGS. 12 to 17 to effect further separation movement between the guide 20 and the clamping section 22. The further separation movement further tensions and thereby assists in cleaving the optic fiber core 12 extending between the necked barrier 46 of the guide 20 and the clamping section 22.

Figure 6:
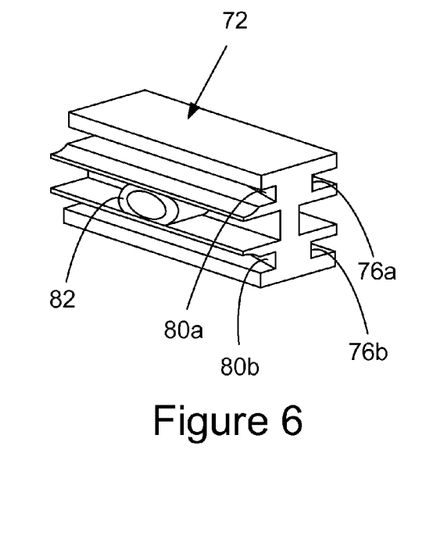
FIG. 6 is a front perspective view of a sliding member of the apparatus shown in FIG. 1.

As particularly shown in FIGS. 6 & 7, to facilitate this transverse movement of the sliding member 72 in direction $D_{SMC}$, the cleaving member 28 includes two tapered flanges 74a, 74b arranged to engage and translate along corresponding tapered sections 76a, 76b of the sliding member 72 as the cleaving member 28 moves from the receiving position towards the cleaving position and beyond to the further tensioning position shown in FIGS. 12 to 17.

The cleaving member 28 also includes two tapered flanges 78a, 78b arranged to engage and translate along corresponding tapered sections 80a, 80b of the sliding member 72 as the cleaving member 28 moves from the further tensioning position back towards the receiving position. This facilitates transverse movement of the sliding member 72 in a direction opposite to direction $D_{SLC}$ to restore the sliding member 72 back to its previous position.

As particularly shown in FIGS. 4 and 6, the sliding member 72 includes a cylindrical guide recess 82 shaped to receive, and seat therein, a terminal end section 86 of the guide 20. The diameter of the cylindrical guide recess 82 is preferably 1.0 mm. The cylindrical guide recess 82 allows the passage of the optic fiber core 12 therethrough so that it can pass from the receiving section 18 to the clamping section 22 in the manner shown. In the described arrangement, transverse movement of the sliding member 72 in direction $D_{SLC}$, as a result of the cleaving member 28 moving towards the cleaving position and beyond to the further tensioning position in direction $D_{CMC}$, forces the guide 20 coupled thereto to move away from the clamping section 22. At least partial separation movement between the guide 20 and the clamping section 22 is thereby effected.

Figure 9:
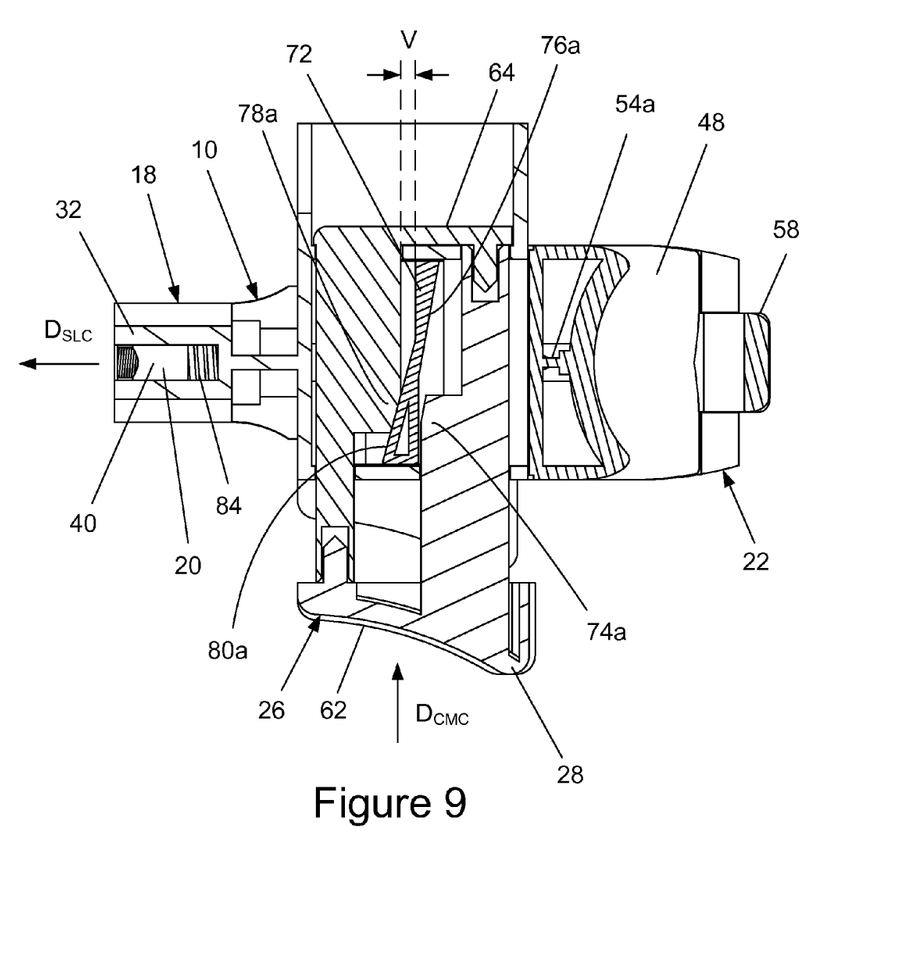
FIG. 9 is a section view of the apparatus shown in FIG. 8 through the line B-B.
Figure 15:
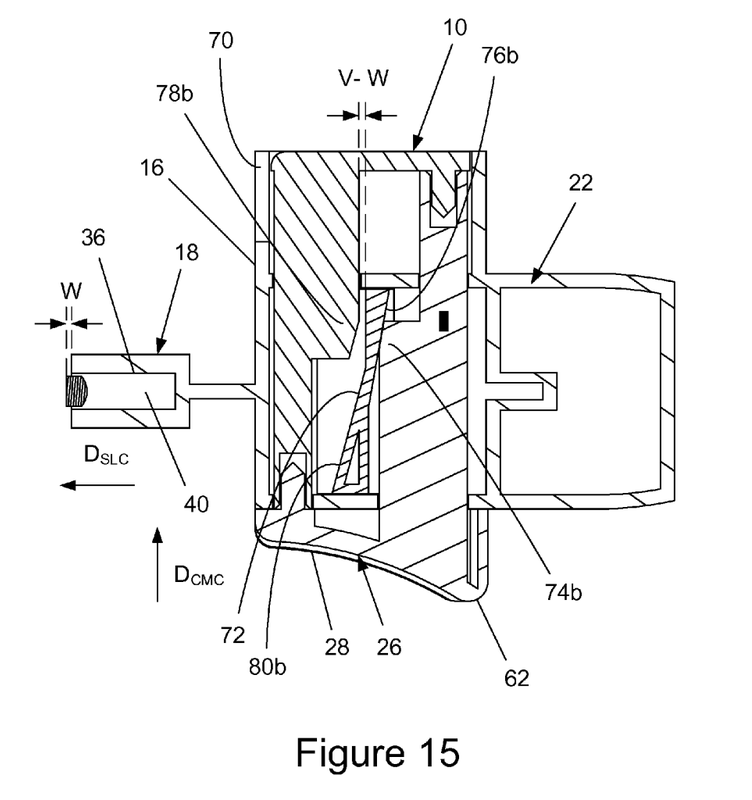
FIG. 15 is a section view of the apparatus shown in FIG. 14 through the line C-C.
Figure 16:
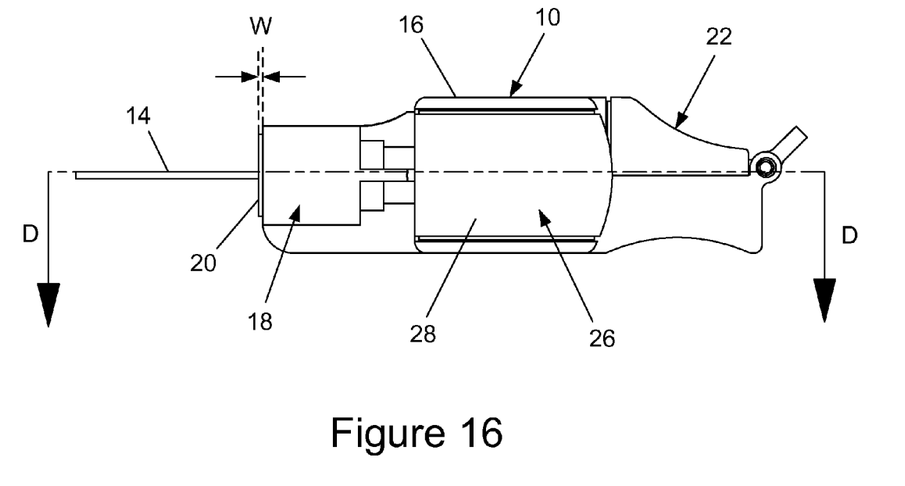
FIG. 16 is a side view of the apparatus shown in FIG. 12 coupled to an optic fiber.
Figure 17:
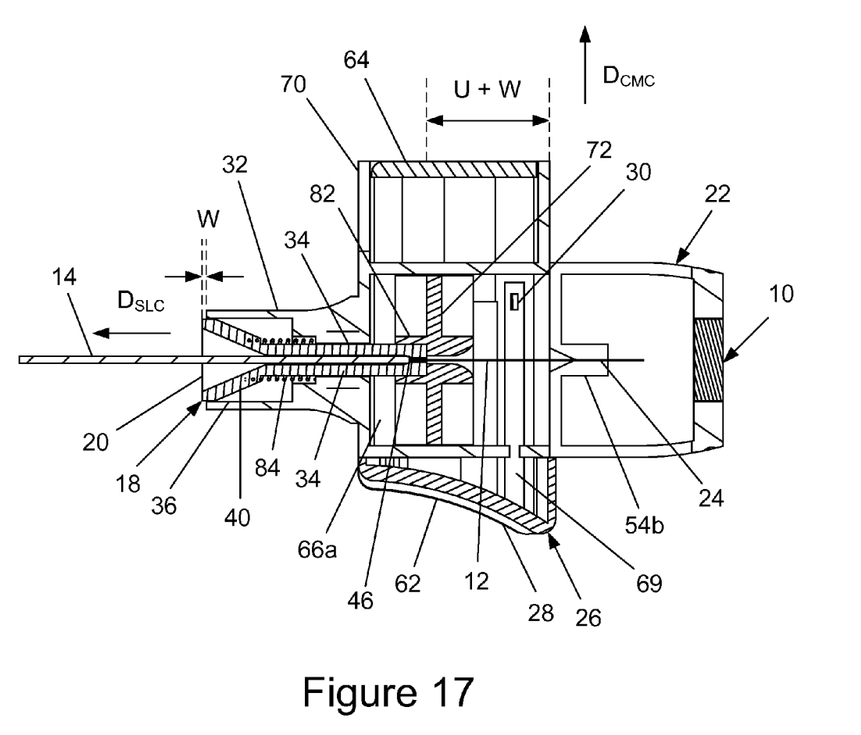
FIG. 17 is a section view of the apparatus shown in FIG. 16 through the line D-D.

As shown in FIG. 4, the terminal end section 86 of the guide 20 is distance "U" from the clamping section 22 when the cleaving member 28 is arranged in the receiving position. As the cleaving member moves towards the cleaving position, and beyond to the further tensioning position, in direction $D_{CMC}$, the tapered flanges 74a, 74b of the cleaving member 28 engage respective tapered sections 76a, 76b of the sliding member 72 forcing transverse movement of the sliding member 72 in direction $D_{SLC}$ resulting in separation movement between the guide 20 and the clamping section 22 by distance "W". As shown in FIG. 9, an inner edge of the flange 78a of the cleaving member 28 is a distance "V" from an opposing edge of the sliding member 72 when the cleaving member is in the receiving position. As shown in FIG. 15, this same edge of the sliding member 72 moves closer to the same edge of the cleaving member 28 to a distance "V-W" when the cleaving member 28 has moved to the further tensioning position.

The receiving section 18 includes resilient means 84 for acting against movement of the guide 20 away from the clamping section 22 in direction $D_{SLC}$ so as to act to return the guide 20 to its original position when the cleaving member 28 moves from the cleaving position back towards the receiving position.

A technician can thereby use the apparatus 10 to quickly and easily cleave an optic fiber core 12 in preparation of either fusion or mechanical fiber splicing by performing the steps of:

1. Stripping the primary buffer of an end section of optic fiber 14 to expose approximately 30 mm of optic fiber core 12;
2. Depressing the reset button 64 fully into the housing 16 of the apparatus 10 so that the guide 20 has retracted into the guide support 32;
3. Opening the clamping lid 48 and inserting the optic fiber core 12 into the guide 20 of the receiving section 18 until the buffer of the stripped end of the optic fiber core 12 engages the necked barrier 46;
4. While forcing the optic fiber core 12 into the guide 20 in the manner described in step 3, closing the clamping lid 48 and holding it closed under pressure;
5. Whilst applying pressure on the clamping lid 48 in the manner described in step 4, pushing the cleave button 62 from the receiving position towards the cleaving position so that the blade 30 at least partially fractures the optic fiber core, wherein movement of the cleaving member 28 towards the cleaving position and beyond to the further tensioning position effects at least partial separation movement between the guide 20 and the clamping section 22 so as to tension and thereby cleave the optic fiber core extending therebetween; and
6. Removing the cleaved fiber core from the apparatus 10 for use in a mechanical splice connection, for example.

As above-mentioned, the act of stripping the optic fiber 14 can preferably be done using standard industry hand tools.

The above-described steps performed to cleave the optic fiber core 12 generate an audible click when the core is fractured and cleaved. The guide 20 visibly projects from the guide support 32 when the cleave button 62 is fully inserted into the housing 16.

The lid 48 of the clamping section 22 is opened to reveal the unwanted fiber stub. The unwanted stub can either be temporarily brushed aside into the fiber storage compartment 56 of the apparatus 10 or removed permanently and disposed in a sharps bin.

Many modifications will be apparent to those skilled in the art without departing from the scope of the present invention Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

LIST OF PARTS

10 Apparatus
12 Optic fiber core
14 Optic Fiber
16 Housing
18 Receiving section
20 Guide
22 Clamping section
24 End section of optic fiber core
26 Cleaving section
28 Cleaving member
30 Cleaving blade
32 Guide support
34 Inner section of the guide support
36 Outer section of the guide support
38 Inner section of the guide
40 Outer section of the guide
42 Outer edge of the outer section of the guide
44 Outer peripheral edge of the outer section of the guide support
46 Necked barrier
48 Lid
50 Base
52 Hinge
53 Axle
54a, 54b Clamping platform
56 Storage compartment
58 Lever
62 Cleave button
64 Reset button
66a, 66b, 66c, 66d Elongate members
68a, 68b, 68c, 68d Pairs of translation slots
69 Cleaving arm
70 Access point
71 Cleaving arm slot
72 Sliding member
74a, 74b, 78a, 78b Tapered flange
76a, 76b, 80a, 80b Tapered section
82 Guide recess
84 Spring
86 Terminal end section of the guide

The invention claimed is:

1. Apparatus for mechanically cleaving a stripped end section of an optic fiber core, comprising:
    (a) a receiving section including an optic fiber guide for receiving the stripped end section of the optic fiber core;
    (b) a clamping section for receiving a terminal end section of the optic fiber core from the receiving section and securing said terminal end section in a fixed position; and
    (c) a cleaving section including a cleaving member and cleaving blade, said member being operable to move between an optic fiber receiving position and an optic fiber cleaving position where the blade is positioned to at least partially fracture the optic fiber core extending between the receiving section and the clamping section,
    wherein movement of the cleaving member towards the cleaving position effects at least partial separation movement between the guide and the clamping section so as to tension and thereby cleave the optic fiber core extending therebetween.

2. The apparatus claimed in claim 1, wherein the cleaving member includes a cleave button and a reset button separated by one or more elongate members which are shaped to translate through corresponding pairs of translation slots of the cleaving section as the cleaving member moves between the receiving position and the cleaving position.

3. The apparatus claimed in claim 2, wherein the cleaving section includes a sliding member through which the cleaving member translates between the optic fiber receiving position and the optic fiber cleaving position.

4. The apparatus claimed in claim 3, wherein the sliding member is adapted to move transversely to a direction of movement of the cleaving member as the cleaving member translates through the sliding member towards the cleaving position, the transverse movement effecting said at least partial separation movement between the guide and the clamping section so as to tension and thereby cleave the optic fiber core extending therebetween.

5. The apparatus claimed in claim 4, wherein the sliding member engages the guide of the receiving section during said transverse movement and forces the guide away from the clamping section thereby effecting said at least partial separation movement between the guide and the clamping section.

6. The apparatus claimed in claim 5, wherein the cleaving member includes one or more tapered flanges arranged to engage and translate along corresponding tapered sections of the sliding member as the cleaving member moves towards the optic fiber cleaving position to effect the transverse movement.

7. The apparatus claimed in claim 1, wherein the receiving section includes resilient means for acting against movement of the guide away from the clamping section so as to act to return the guide to its original position when the cleaving member moves from the cleaving position back towards the receiving position.

8. The apparatus claimed in claim 1, wherein the cleaving member is adapted to travel beyond the cleaving position to a further tensioning position to effect further separation movement between the guide and the clamping section so as to further tension and thereby cleave the optic fiber core extending therebetween.

9. The apparatus claimed in claim 1, wherein the guide includes a necked barrier for limiting movement of casing of the optic fiber core through the guide.

10. The apparatus claimed in claim 9, wherein the casing includes cladding, buffer and/or jacket of the optic fiber core.

11. The apparatus claimed in claim 9, wherein the optic fiber core is tensioned between the necked barrier and the clamping section.

12. The apparatus claimed in claim 1, wherein the clamping section mechanically clamps the terminal end section of the optic fiber core.

13. The apparatus claimed in claim 12, wherein clamping section includes a lid and a base, the lid and the base being coupled together by a hinge to mechanically clamp the terminal end section of the optic fiber therebetween.

14. The apparatus claimed in claim 13, wherein the base includes a storage compartment for temporarily storing cleaved end sections of optic fiber cores.

15. A method for mechanically cleaving an optic fiber core, including the steps of:
  (a) providing an apparatus for mechanically cleaving a stripped end section of an optic fiber core, including:
    (i) a receiving section including an optic fiber guide for receiving the stripped end section of the optic fiber core;
    (ii) a clamping section for receiving a terminal end section of the optic fiber core from the receiving section and securing said terminal end section in a fixed position; and
    (iii) a cleaving section including a cleaving member and cleaving blade, said member being operable to move between an optic fiber receiving position and an optic fiber cleaving position where the blade is positioned to at least partially fracture the optic fiber core extending between the receiving section and the clamping section;
  (b) inserting the optic fiber core into the guide of the receiving section of the apparatus until a terminal end section of the optic fiber core is arranged in the clamping section of the apparatus;
  (c) securing the terminal end section of the optic fiber core in a fixed position in the clamping section; and
  (d) moving the cleaving member of the apparatus from a receiving position towards a cleaving position so that a cleaving blade at least partially fractures the optic fiber core,
  wherein movement of the cleaving member towards the cleaving position effects at least partial separation movement between the guide and the clamping section so as to tension and thereby cleave the optic fiber core extending therebetween.

16. The method claimed in claim 15, including the step of further moving the cleaving member from the cleaving position towards a further tensioning position to effect further separation movement between the guide and the clamping section so as to further tension and thereby cleave the optic fiber core extending therebetween.

* * * * *